United States Patent Office 2,979,281
Patented Apr. 11, 1961

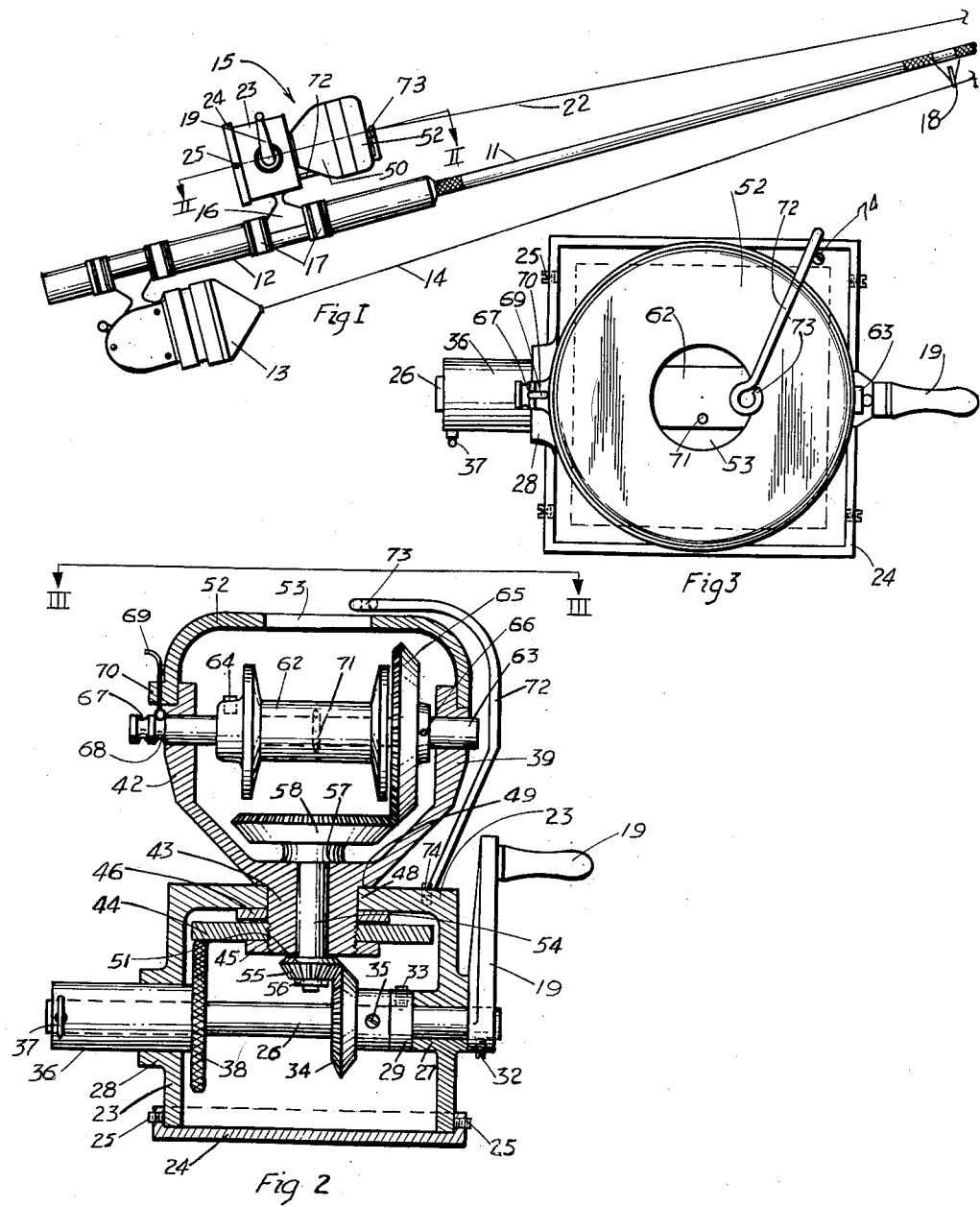

2,979,281

APPARATUS FOR UNTWISTING LINES

Alvin O. Shafer, 2003 Lakeway, Kalamazoo, Mich.

Filed Mar. 26, 1959, Ser. No. 802,092

7 Claims. (Cl. 242—84.1)

This invention relates to apparatus useful in untwisting twisted fishing lines, cord, rope and the like, particularly to apparatus in which the degree of untwisting afforded can be regulated to correspond with the degree of twisting of the twisted line. This application is a continuation-in-part of application Serial No. 682,775, filed September 9, 1957, and now abandoned.

It is characteristic of many uses of cord, rope, fishing lines and other comparable long, flexible articles, herein referred to broadly as "lines," that during use they become twisted. If the degree of twisting is excessive, the line is prone to kink and become snarled and knotted easily and, in exaggerated instances, may be injured beyond repair or even twisted in two. An example of such twisting is in the use of fishing line for trolling. In this procedure a long length of line is trailed behind a moving boat. A bait or lure is secured to the trailing end of the line and, in a majority of instances, the action of the water on the bait or lure moving through it causes the bait or lure to spin either unavoidably or by reason of the deliberate construction of the lure in a way to cause this effect. Although such trolling lines are invariably provided with swivels adjacent to the lure to minimize the twisting of the line, such a swivel does not become effective to any appreciable degree until the line has become twisted sufficiently to provide resistance to further twisting sufficient to overcome the friction of the swivel. The line is thus generally subject to tangling and snarling regardless of the fact that a swivel is used. Other examples of lines which become twisted during use with equally inconvenient results could be given. The present invention will, however, be described with particular respect to apparatus especially suited to the untwisting of fishing lines, it being understood, that the invention is not limited thereby.

In the parent application there is described and claimed apparatus useful in untwisting twisted lines wherein the twisted line is wound on a reel or spool and, during the winding, the shaft on which the spool is mounted is caused to rotate not only around its longitudinal axis to wind the line on the spool, but also in an end-over-end manner so that its longitudinal axis rotates in a plane roughly normal to the direction of travel of the line to the spool. With the axis of the spool shaft rotating in the proper direction, the line being wound on the spool is untwisted one complete turn for every revolution of the longitudinal axis of the spool shaft in the plane.

Although the untwisting apparatus described and claimed in the parent application is of value for the purpose intended, it suffers from one disadvantage due to the fact that the ratio of the rates of rotation of the line-receiving spool about the longitudinal axis of the spool shaft and of the longitudinal axis of the shaft in a plane has a constant value and that, therefore, the amount of untwisting of the line cannot be regulated to correspond with the degree to which the line is twisted. It is apparent that under such circumstances only a line which has been twisted to a certain degree, depending upon the ratio of the rates of rotation referred to, will be untwisted to a degree corresponding precisely to the degree to which it has been twisted. If the line has been twisted to a degree greater than the degree of untwisting provided by the particular apparatus employed, it will not be untwisted completely by being wound on the apparatus of the parent application, whereas if it has been twisted to a lesser degree than the degree of untwisting provided by the apparatus, it will not only be untwisted completely but will be retwisted to some extent in the opposite direction. Although this feature of the apparatus of the parent application is not unduly disadvantageous insofar as the untwisting of fishing line is concerned, due to the fact that a fisherman generally begins to experience difficulty with a particular line after it has become twisted to about a certain degree, it is desirable that provision be made for varying the degree of untwisting as the line is wound on the spool in a manner such that the line is as completely untwisted as possible but so that it is not retwisted appreciably in the opposite direction regardless of the degree of twisting of the particular line which is being untwisted. This is especially true when the apparatus is to be employed for lines of various sorts used in different ways in which they become twisted to varying degrees. Furthermore, fishing lines themselves are prone to cause inconvenience under different degrees of twisting, depending upon the length of line being used and upon the size, nature and other physical characteristics of the line itself. A woven line, for example, will not give rise to difficulty under the same degree of twisting, i.e. the same number of twisting turns per unit length, as will other kinds of line such, for example, as monofilament lines. It is, therefore, apparent that apparatus useful in the untwisting of lines in which the degree of untwisting could be adjusted to correspond closely to the degree of twisting of the line would be of great value.

According to the present invention, these and related objects are effected readily and economically by providing a line-receiving spool mounted on a spool shaft on which the twisted line can be wound as the spool rotates about the longitudinal axis of the shaft and in which the shaft carrying the spool can also be caused to rotate simultaneously in an end-over-end manner with its longitudinal axis essentially in a plane normal to the direction of travel of the line to the spool, but in which the rate of rotation of the longitudinal axis of the shaft in the plane can be varied with respect to the rate of rotation of the spool about the longitudinal axis of the spool shaft. As will be apparent from the following description, this is accomplished by providing means whereby the spool is caused to rotate about the longitudinal axis of the spool shaft at a given rate and whereby, with the spool rotating at this same rate, the rotation of the shaft in an end-over-end manner with its longitudinal axis rotating in a plane can be varied by suitable adjustment of the apparatus.

The apparatus of the invention can be understood readily by reference to the accompanying drawing wherein, in the interest of clarity, certain features are shown on a somewhat exaggerated scale and wherein:

Figure 1 is a side elevation of a conventional fishing rod handle and reel showing one modificaiton of the apparatus in a position for use in untwisting the fishing line used with the reel;

Figure 2 is a view, principally in section and with certain of the parts rearranged, taken along the line II—II of Figure 1; and Figure 3 is an elevation, with certain of the parts rearranged, taken along the line III—III of Figure 2.

In Figure 1 there is shown a part of a conventional fishing rod 11 equipped with a conventional handle 12 and spinning reel 13. The fishing line 14 extends from the reel 13 through suitable guides 18 along the rod to the tip of the rod, not shown, and thence during normal fishing into the water in conventional manner. There is also illustrated in Figure 1, as indicated generally by the reference numeral 15, a line untwister constructed, as will be described later, in accordance with the present invention which is provided with a conventional type base or foot 16 by means of which the apparatus can be secured to the handle 12 with conventional adjustable bands 17 which encircle the handle 12. For purposes of convenience, the line untwister when used in this way is generally mounted on the side of the rod handle opposite the regular reel. It is pointed out that this way of securing the line untwister 15 to the handle 12 is in itself entirely conventional in character and, as will be noted, corresponds closely to the way in which the reel 13 is secured to the handle 12. Other suitable means can, of course, be employed for securing the untwister to a fishing rod handle or, when the untwister is to be employed for untwisting lines other than fishing lines, for securing it to any suitable support. As will be apparent later, it is also entirely feasible, even when a fishing line is to be untwisted, to secure the line untwister to a support other than the handle of the fishing rod, e.g. to the seat or side of a boat or in any other suitable or convenient location.

In general, with the arrangement illustrated in Figure 1 the use of the line untwister can be described as follows, the actual construction and mode of operation of the untwister being described later. When the fishing line 14 through prolonged use becomes unduly twisted, it is convenient to disengage the hook or lure from the free end of the line and, with the line still extending through the guides and tip of the rod in the normal manner, to engage the free end of the line with the untwisting mechanism. The line untwister is then actuated, e.g. by turning the crank 19, whereupon the twisted line is unwound from the reel 13 and travels through the guides and tip of the rod and thence, as illustrated at 22, to the line untwister 15 wherein it is wound upon a line-receiving spool. While the spool rotates about its longitudinal axis, the shaft on which the spool is mounted also rotates in end-over-end manner, at a rate adjusted to correspond with the degree of twisting of the line, with its longitudinal axis rotating in a plane in the manner previously referred to, the net result being that the line is wound on the spool in an untwisted condition. By means which will be described subsequently, the spool of the untwister can then be disconnected from the driving mechanism so that it is free-running and the untwisted line can be unwound from it without retwisting. The untwisted line is then rewound on the reel 13, directly from the untwister, the hook or lure is again attached to the end of the line and fishing is resumed.

Referring now to Figure 2, it will be noted that the line untwister of the invention comprises a suitable housing 23 which is conveniently of boxlike configuration and which is suitably provided with any convenient means for mounting the line untwister on a suitable support, as referred to in the description of Figure 1. In the illustration given, the housing 23 is provided with a removable cover 24 which can be secured in place by suitable set screws 25 and which can be removed at will to provide access to the interior of the housing 23.

A primary drive shaft 26 extends through the housing 23 and is journaled in suitable bearings 27 and 28 in opposite walls of the housing. The protruding end of the shaft 26 at one side of the housing is provided with a conventional crank 19 or other suitable means whereby the shaft 26 can be rotated in either direction. Longitudinal movement of the shaft 26 in the bearings 27 and 28 is prevented by the proper locations of the crank 19 and of a suitable collar 29 which are secured to the shaft by appropriate set screws 32 and 33, respectively, in abutting relationship with the ends of the bearing 27. A primary driving gear 34 is mounted on the shaft 26 and secured thereto, e.g. by a set screw 35, in a suitable location adjacent to the collar 29, the function of which will be apparent as the description proceeds.

The end of the primary drive shaft 26 opposite the crank 19 protrudes from the housing for a suitable distance and is equipped with an elongated slidable bushing or sleeve 36, the bearing 28 at this side of the housing being large enough to accommodate the bushing 36 which rotates therein. The bushing 36 is provided near its outer end with a thumb screw 37 by means of which it can be locked to the primary drive shaft 26 so as to rotate therewith in the bearing 28. By loosening the thumb screw 37, the bushing 36 can be slid longitudinally along the primary drive shaft 26, the reason for which will be apparent as the description proceeds, and again locked to the shaft 26 at a desired position thereon.

The end of the bushing 36 which protrudes into the interior of the housing 23, i.e. its "inner" end, is provided with a friction drive disk 38 which is secured permanently to the bushing so as to rotate therewith. It is often convenient to form the bushing 36 and the disk as a single unitary element. The disk 38 functions, as will be apparent later, as the driving disk of a friction disk drive of the type often referred to as a "crown" drive. For this reason it is convenient, and generally desirable, that its peripheral surface be faced with a suitable material, such as rubber or a suitable synthetic resinous composition, illustrated by the crossed hatching of Figure 2, to insure its positive frictional engagement with the driven disk which will be described later.

A suitable yoke is provided, the arms 39 and 42 of which are located outside the housing 23 and the base or stem 43 of which is journaled in a bearing 48 in a wall of the housing 23, with its longitudinal axis normal to, and with its prolongation intersecting, the longitudinal axis of the primary drive shaft 26. The end of the stem 43 of the yoke which protrudes into the housing is provided with the driven friction disk 44 of the friction disk, or crown, drive referred to previously. The driven friction disk 44 conveniently engages the yoke stem threadably, a lock nut or follower 45 being provided to retain the disk at its proper location on the stem 43 to prevent undue end play of the stem in the bearing 48 but to still permit easy rotation of the stem in the bearing. A suitable spacing washer 46 is conveniently located between the disk 44 and the bearing 48. The yoke is provided with a shoulder 49 which encircles the outer end of the stem 43 and which bears against the outer end of the bearing 48. In the modification illustrated the arms of the yoke 39 and 42 are extended laterally in circular fashion to form a spool housing 50, of Figure 1, of circular cross section open at its forward end opposite the stem 43 and a suitable circular cap 52 is secured to the housing, e.g. frictionally or by means of set screws, not shown, so that it covers the forward open end of the housing except for a circular central opening 53 in the cap, the purpose for which will be apparent as the description proceeds.

The stem 43 of the yoke is bored longitudinally to accommodate in rotatable fashion a secondary drive shaft 54 which is journaled in the bore and which is of reduced diameter adjacent to its inner end to provide a shoulder 51 against which is seated a suitable primary driven gear 55 secured on the end of the shaft by a nut 56 so as to rotate therewith. The secondary drive shaft 54 is provided near its outer end with an encircling shoulder 57 which bears against the outer end of the yoke stem 43, the length of the shaft 54 between the shoulders 57 and 51 being slightly greater than the length of the yoke stem 43 to provide for easy turning of the shaft in the bore of the stem but to prevent undue end play of the shaft when the gear 55 is seated firmly on the shoulder 51. The gear 55 can be keyed to the shaft 54, if desired. The primary driving gear 34 is located on the primary drive shaft 26 so as to mesh with the primary driven gear 55, the ratio of the two gears being selected to provide a suitable rate of rotation of the secondary drive shaft 54 with respect to the rate of rotation of the primary drive shaft 26. The outer end of the secondary drive shaft 54 is provided with a secondary driving gear 58 located inside the spool housing 50 which rotates with the shaft 54.

A suitable line-receiving spool 62 is mounted on a suitable spool shaft 63 which extends between, and is journaled near its ends in, suitable bearings formed in the yoke arms 39 and 42. The line-receiving spool 62 is secured to the spool shaft 63, as by a set screw 64, so that the spool and shaft rotate as a unit. Any convenient means is provided for securing the end of a line to the spool 62 to enable it to be wound thereon, one convenient means consisting of a hole, 71, drilled off center through the spool to avoid the shaft 63. A suitable secondary driven gear 65 is secured at one end of the line-receiving spool 62, e.g. by a set screw 66, securing it to the shaft 63, the gear 65 thus rotating as a unit with the shaft 63 in mesh with the secondary driving gear 58 when the apparatus is adjusted, as will be explained later, for untwisting a line.

The end of the spool shaft 63 opposite the secondary driven gear 65 protrudes for a suitable distance through the yoke arm 42 and is provided with outer and inner encircling locking grooves 67 and 68, respectively. A suitable locking pin or key 69 is also provided in association with the yoke arm 42 or the cap 52 referred to previously, e.g. slidably located in a suitable projection or boss 70 formed integral with the cap 52, one end of which may be engaged with, or disengaged from, one or the other of the locking grooves 67 or 68, the particular locking groove which it engages depending upon the longitudinal location of the spool shaft 63 in the bearings in the yoke arms 39 and 42. Thus with the locking pin 69 engaging the inner locking groove 68, as illustrated in Figure 2, longitudinal movement of the spool shaft 63 is prevented and the secondary driven gear 65 is maintained in mesh with the secondary driving gear 58, the apparatus thus being adjusted for untwisting a line. However, if the locking pin 69 is disengaged from the inner locking groove 68 and the spool shaft 63 is then slid longitudinally in its bearings and the locking pin 69 engaged with the outer locking groove 67, it will be noted that the secondary driven gear 65 will have been moved out of mesh with the secondary driving gear 58 and locked in this position and the line-receiving spool 62, the spool shaft 63 and the secondary driven gear 65 can then rotate as a free-running unit.

It is thus apparent from the foregoing description that, with the locking pin 69 engaging the inner locking groove 68, with the end of a twisted line passing through the central opening 53 in the cap 52 and being secured in the hole 71 in the spool 62 and with the driving friction disk 38 adjusted properly along the primary drive shaft 26, it is only necessary to rotate the primary drive shaft 26 in the proper direction to wind the line in untwisted form on the spool 62. Following the winding of the line in untwisted condition on the spool 62, the locking pin 69 can be lifted out of engagement with the inner locking groove 68, the assemblage of spool shaft 63, spool 62 and secondary driven gear 65 can then be slid endwise to disengage the gear 65 from the secondary driving gear 58 and to bring the outer locking groove 67 into line with the locking pin 69, after which the pin 69 can be engaged with the outer locking groove 67. The untwisted line can then be unwound from the spool 62, e.g., rewound upon a conventional fishing reel, without danger of retwisting it in either direction during the process.

It will be noticed from the modification of Figure 2 that, since the primary driving gear 34 and the driving friction disk 38 are located on opposite sides of the longitudinal axis of the secondary drive shaft 54, rotation of the primary drive shaft 26 in either direction will cause the secondary drive shaft 54 and the driven friction disk 44 to rotate in opposite directions. Since rotation of the secondary driving gear 58 in one direction will cause the secondary driven gear 65 and the spool 62 to rotate in one direction, and since rotation of the driven friction disk 44 and the housing 50 in a direction opposite to that of the rotation of the gear 58 will cause the secondary driven gear 65, because of its travel around the gear 58, to rotate additionally in the same direction, it will be apparent that the number of revolutions of the spool 62 around the longitudinal axis of the shaft 63 for each revolution of the primary drive shaft 26 will be the sum of the revolutions imparted to it by the action of the gear 34 on the gear 55 and by the action of the friction disk 38 on the friction disk 44. On the other hand, the number of untwisting turns imparted to a line being wound on the spool 62 for each revolution of the primary drive shaft 26 will depend only upon the driving ratio of the driving disk 38 for the driven disk 44.

Thus, if the apparatus is constructed so that the driving ratio between the gears 34 and 55 and between the gears 58 and 65 is each a 1:1 ratio, and if the apparatus is adjusted, e.g. by shifting the driving disk inwardly of the housing along the shaft 26, to cause two revolutions of the disk 44 for each revolution of the primary drive shaft 26, it will be seen that for each revolution of the shaft 26 two untwisting turns will be imparted to the line for each three revolutions of the spool 62 about its longitudinal axis causing the line to be wound upon it. If, however, the driving disk 38 is then shifted along the shaft 26 so that it engages the disk 44 nearer its periphery in a manner such that the disk 44 rotates once for each rotation of the disk 38, it will be seen that the apparatus will then operate to impart one untwisting turn to the line for each two revolutions of the spool about its longitudinal axis.

It is thus seen that, to provide for maximum untwisting of the line per unit length of line wound on the spool, the friction disk 38 should engage the friction disk 44 as near the center of the latter as possible. The number of untwisting turns per unit length of line wound on the spool 62 decreases as the point of engagement of the friction disk 38 with the friction disk 44 is shifted toward the perimeter of the latter.

It should, however, be noted that the foregoing generalizations require some modification due to the fact that, as additional lengths of line are wound on the spool 62, the effective diameter of the body of the spool insofar as the length of line wound upon it per revolution is concerned becomes greater. Thus, for any setting of the apparatus, the degree of untwisting of the line per unit length of line becomes gradually smaller as the amount of line wound on the spool becomes greater. For this reason when long lengths of line are involved, it may at times be advisable to shift the friction disk 38 inwardly of the housing 23 along the shaft 26 for a short distance once or twice during the untwisting operation.

To provide for level winding of a line upon the spool 62 during the untwisting process, it is convenient to provide a fixed level wind rod, such as a properly bent rod 72 located entirely outside the housing 50 and the cap 52, one end of which is secured in suitable fashion to the non-rotatable housing 23, e.g. by securing its end, with a set screw 74, in a suitable hole in the housing, and which terminates at its other end in a suitable eyelet 73 through which the twisted line can run on its travel to the spool 62. The eyelet 73 is located off center with respect to the longitudinal axis of the spool 62, preferably by a distance approximately equal to one-half the length of the spool body. The opening 53 in the cap 52 is, of course, large enough to allow the line to travel through the eyelet 73 to the spool without fouling against the edge of the opening. By the provision of the eyelet 73 located in the manner just described, a line traveling through the eyelet to the spool 62 will be wound levelly back and forth along the spool during the untwisting operation due to the end-over-end rotation of the spool shaft 63, as described previously, which serves to bring the two ends of the spool alternately beneath the eyelet. When the untwisted line is withdrawn from the free-running spool following the untwisting operation, it runs out easily through the eyelet 73 even though the eyelet may be off center with respect to the spool. However, if desired, the eyelet 73 can be incompletely closed, thus furnishing a slit through which the line can be slipped to disengage it from the eyelet during the unwinding procedure.

I claim:

1. In a device for untwisting a twisted fishing line, the combination of elements including: a suitable housing including opposite walls adapted to be mounted in a suitable location; a primary drive shaft extending through the housing and mounted rotatably in opposite walls thereof; a primary driving gear and a slidably adjustable driving friction disk mounted on the primary drive shaft and rotatable therewith; a yoke including a stem and a pair of arms having its stem bored longitudinally and mounted rotatably in a wall of the housing with its longitudinal axis co-planar with, and extending normally to, the longitudinal axis of the primary drive shaft and with the arms of the yoke outside the housing; a driven friction disk secured to the yoke stem inside the housing adapted to engage and be driven rotatably by the driving friction disk whereby the yoke can be rotated around the longitudinal axis of its stem; a spool shaft extending between and mounted rotatably in the arms of the yoke having a line-receiving spool mounted thereon to rotate therewith; a secondary driven gear associated with and rotatable with the spool and spool shaft; a secondary drive shaft mounted rotatably in the longitudinal bore of the yoke stem; a primary driven gear secured to the end of the secondary drive shaft inside the housing in mesh with the primary driving gear; and a secondary driving gear mounted on the end of the secondary drive shaft opposite the primary driven gear and adapted to mesh with the secondary driven gear whereby, upon rotation of the primary drive shaft, the line-receiving spool can be caused to rotate around the longitudinal axis of the spool shaft and the spool shaft can be caused to rotate in end-over-end fashion with its longitudinal axis rotating in a plane.

2. Apparatus as claimed in claim 1 including locking means for securing the driving friction disk on the primary drive shaft at a suitable location radially of the axis of the driven friction disk whereby the ratio of the rates of rotation of the line-receiving spool and of the longitudinal axis of the spool shaft in a plane can be adjusted to a suitable value.

3. Apparatus as claimed in claim 1 including, additionally, a bushing which is secured at one of its ends to the driving friction disk and which encircles and is slidable along a section of the primary drive shaft extending through the adjacent wall of the housing and is provided with means outside the housing for locking it in fixed position on the shaft, the bushing being journaled in the wall of the housing.

4. Apparatus as claimed in claim 1 wherein the spool shaft is slidable longitudinally to engage the secondary driven gear with, and to disengage it from, the secondary driving gear.

5. Apparatus as claimed in claim 1 wherein the spool shaft carrying the line-receiving spool is mounted slidably longitudinally in the yoke arms and wherein means is provided for locking the secondary driven gear alternately in engagement with, and disengaged from, the secondary driving gear.

6. Apparatus as claimed in claim 1 wherein the arms of the yoke are extended laterally to form a rotatable housing of essentially circular cross section.

7. Apparatus as claimed in claim 1 including a stationary, suitably bent level wind rod having one end mounted in fixed position on the housing and terminating at its other end in an eyelet located off center with respect to the longitudinal axis of the line-receiving spool and in the line of travel of a line to the spool.

References Cited in the file of this patent

UNITED STATES PATENTS

| | | |
|---|---|---|
| 275,267 | Purslow | Apr. 3, 1883 |
| 1,117,582 | Leggett | Nov. 17, 1914 |
| 1,246,683 | Tooth | Nov. 13, 1917 |
| 1,952,756 | Henze | Mar. 27, 1934 |
| 2,183,618 | Magruder | Dec. 19, 1939 |
| 2,199,651 | Quick | May 7, 1940 |
| 2,506,230 | MacCreadie | May 2, 1950 |
| 2,574,216 | Lindgren | Nov. 6, 1951 |